No. 789,516. PATENTED MAY 9, 1905.
J. H. WILLIAMS.
CORN PLANTER.
APPLICATION FILED JUNE 27, 1904.
3 SHEETS—SHEET 2.
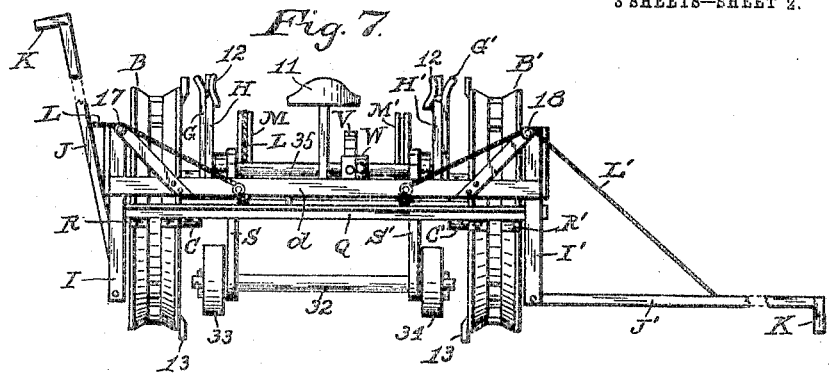
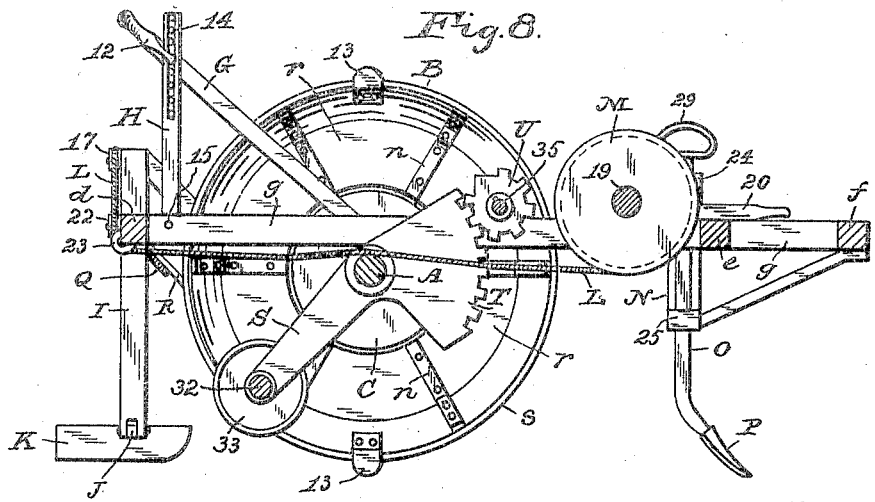
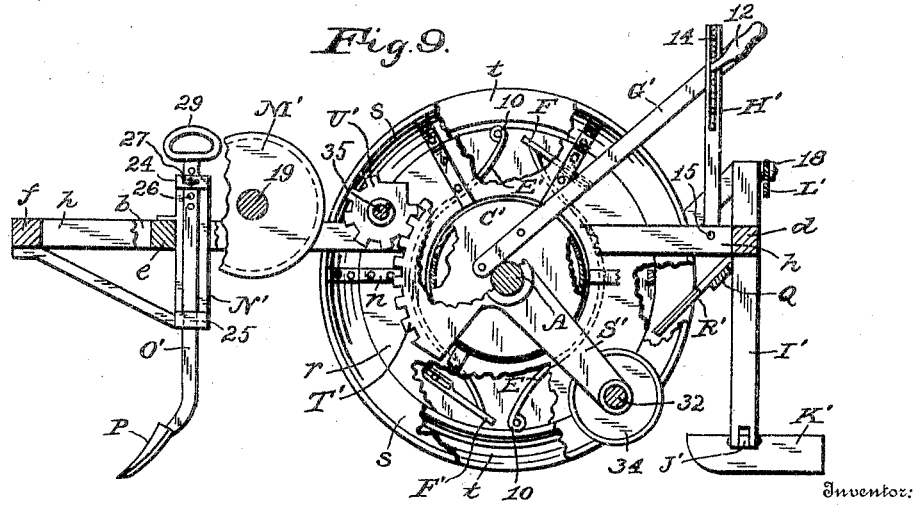
Witnesses:
C. R. Martin.
Stella Snider
Inventor:
John H. Williams,
By
E. T. Silvius,
Attorney.

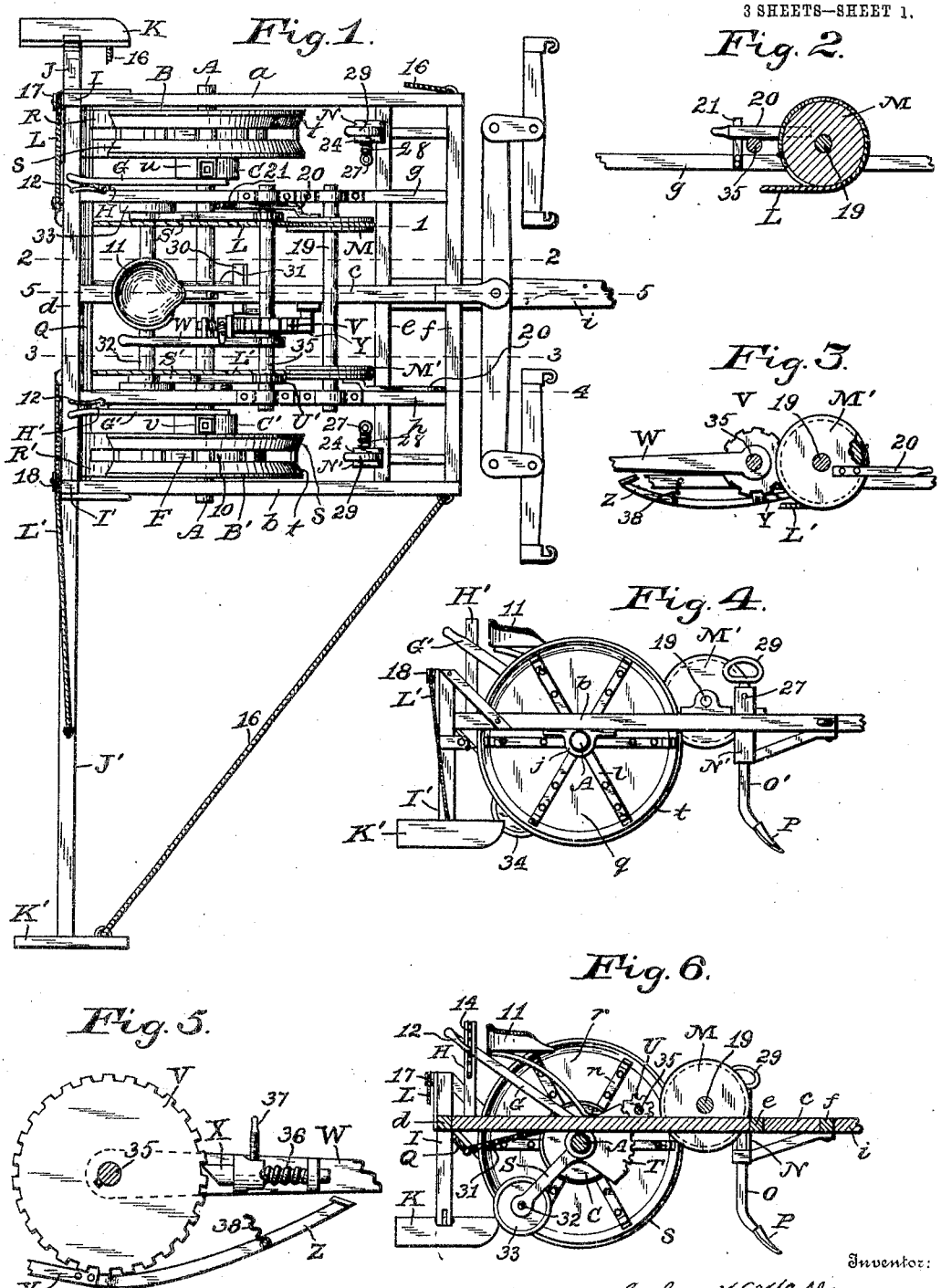

No. 789,516. PATENTED MAY 9, 1905.
J. H. WILLIAMS.
CORN PLANTER.
APPLICATION FILED JUNE 27, 1904.
3 SHEETS—SHEET 3.
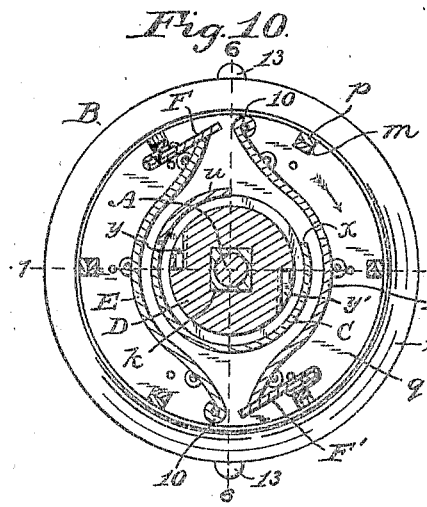
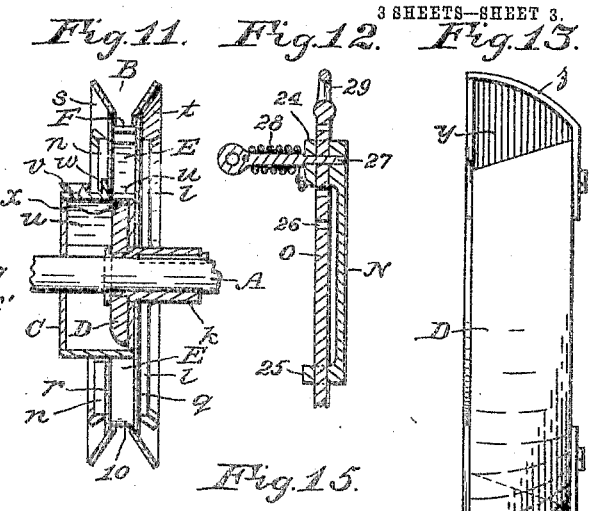
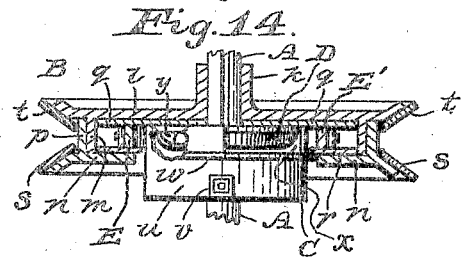
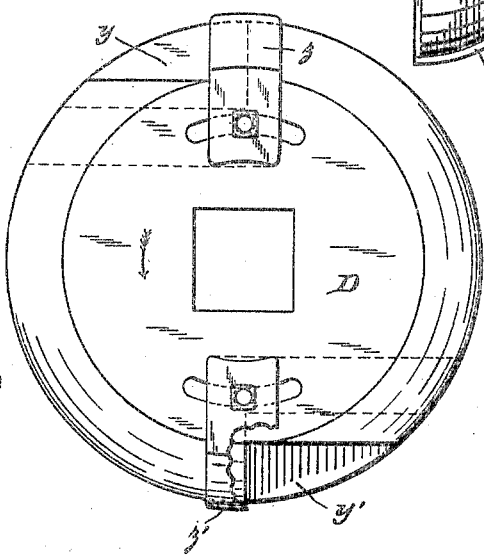
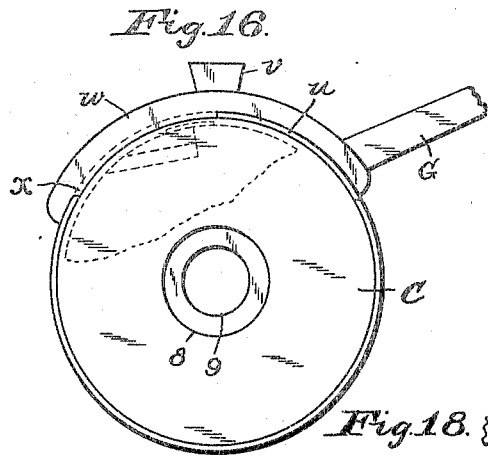
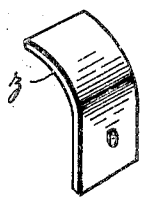
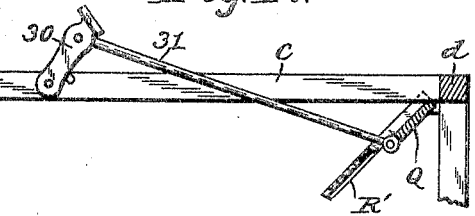
Witnesses:
E. R. Martin
Stella Snider
Inventor:
John H. Williams,
by E. T. Silvius,
Attorney.

No. 789,516. Patented May 9, 1905.

UNITED STATES PATENT OFFICE.

JOHN H. WILLIAMS, OF INDIANAPOLIS, INDIANA.

CORN-PLANTER.

SPECIFICATION forming part of Letters Patent No. 789,516, dated May 9, 1905.

Application filed June 27, 1904. Serial No. 214,224.

*To all whom it may concern:*

Be it known that I, JOHN H. WILLIAMS, a citizen of the United States, residing at Indianapolis, in the county of Marion and State of Indiana, have invented new and useful Improvements in Corn-Planters; and I do declare the following to be a full, clear, and exact description of the invention, reference being had to the accompanying drawings, and to the letters and figures of reference marked thereon, which form a part of this specification.

This invention relates to machines for planting corn, and it has reference particularly to the apparatus for dropping the corn into the ground, to the running-gear, and to other features of lesser importance.

The principal object of the invention is to provide an improved corn-planter especially adapted to plant corn in check-rows without requiring the use of set-wires for operating check-row devices on the machines, and other objects are to simplify the dropping apparatus to the end that speed, accuracy, and economy in operation may be attained.

With the above and other objects in view the invention consists in a corn-planter provided with rotative hill-spacers or wheels through which the corn may be dropped in regularly-spaced positions to form hills and which may be adapted to drop corn in rows.

The invention consists also in a truck for carrying the machine while turning the same at the ends of rows, as well as carrying it on highways; and the invention consists, further, in the novel parts and in the combinations and arrangements of parts, as hereinafter particularly described, and pointed out in the appended claims.

Referring to the drawings, Figure 1 is a top plan view of the machine in which minor parts are omitted, one marker being in operative position and the other marker elevated; Fig. 2, a fragmentary detail view as at the line 1 in Fig. 1; Fig. 3, a fragmentary detail view as at the line 4 in Fig. 1; Fig. 4, a side elevation of the machine, omitting minor parts; Fig. 5, a fragmentary detail view showing a reversible ratchet for operating the carrying-truck; Fig. 6, a vertical longitudinal sectional view at the line 5 5 in Fig. 1; Fig. 7, a rear elevation of the machine; Fig. 8, a vertical longitudinal sectional view as at the line 2 2 in Fig. 1; Fig. 9, a vertical longitudinal sectional view as at the line 4 4 in Fig. 1 looking toward the right-hand side of the machine; Fig. 10, a vertical longitudinal sectional view centrally of one of the sets of spacing and dropping apparatus; Fig. 11, a vertical transverse sectional view on the line 6 6 in Fig. 10; Fig. 12, a fragmentary vertical sectional detail view showing one of the plow shanks and supports; Fig. 13, a front elevation of one of the seed-dropping devices that removes the corn from the seedbox; Fig. 14, a horizontal transverse sectional view as on the line 7 7 in Fig. 10; Fig. 15, a side elevation of one of the seed-dropping devices; Fig. 16, a side elevation of one of the seedboxes; Fig. 17, a fragmentary detail view showing the scraping apparatus for the hill-spacers, and Fig. 18 is a perspective view of a part of a seed-dropping device.

Similar reference characters designate like parts in the several figures of the drawings.

In a practical embodiment of the invention a suitable main frame is provided that is designed to be carried in an approximately horizontal position when the machine is in use, the frame comprising side bars $a$ and $b$, a center bar $c$, a tail-bar $d$, cross-bars $e$ and $f$, and intermediate bars $g$ and $h$, all suitably secured together, and a tongue or pole $i$ is attached to the frame to be supported at its forward end by horses in the usual manner, the tongue supporting the forward portions of the machine and serving to guide the machine.

The side bars $a$ and $b$ are each provided with a journal-box, as $j$, and an axle A is rotatively mounted in the pair of journal-boxes. The hill-spacers are formed as wheels B and B', both alike and adapted for use at opposite sides of the machine, and they carry the machine. Both wheels are secured fixedly to the axle A, so that they must move in unison and with the axle. The seed-corn that is to be planted passes through channels in the wheels and out of openings in the peripheries of the wheels, so that the hills will be equidistant apart in rows. Two openings may be provided in a wheel of convenient size in circumference, and it will be understood that sufficiently-large wheels may have three or more openings and suitable channels leading to the openings.

Each wheel, as B or B', comprises a hub $k$, that is secured to the axle A, and a plurality of spokes $l$, secured to the hub, the spokes being bent outwardly at their ends and provided near their ends with lateral lips $m$. Short spokes $n$, similar to the end portions of the spokes $l$, have each a lateral lip $p$, secured suitably to the lip $m$ of a spoke $l$, the spokes $n$ extending a short distance toward the axis of the hub $k$. A web-plate $q$ is secured to the inner sides of the spokes $l$, and a web-plate $r$ is secured to the inner sides of the spokes $n$, there being a space between the two web-plates, so that the wheel is practically hollow. An inclined face-tire $s$ is secured to the spokes $n$, and a similar tire $t$ is secured to the spokes $l$.

The seedboxes C and C' (a box being provided for each wheel B and B') are each circular in form, an upper portion being removable, as a lid $u$, in order to gain access to the interior and devices inclosed therein. The lid $u$ has a hopper $v$ and is provided with a guard $w$, and in the lid is an opening $x$, through which the corn may be dropped. The box has axial bearings 8 and 9, embracing the axle A, the latter supporting both boxes and rotating in their bearings. Specifically, however, as may be seen in Fig. 11, the inner end of the hub $k$ intervenes between the axle and one of the box-bearings as a matter of convenience, and on the inner end of the hub within the box a seed-dropper D or D' is fixedly secured, so as to move in unison with the wheel and the axle, the box being positioned partly within the hollow wheel against the web $l$ and partly outside the wheel, fitting in the central opening that is provided in the web $r$. The opening $x$ is opposite the seed-dropper and the space between the wheel-webs. Each seed-dropper D and D' has two pockets $y$ and $y'$ in its periphery for lifting the corn from the box and dropping it through the opening $x$. However, there may be as many pockets as there are channels in the wheel and openings in the periphery of the wheel.

Each wheel B and B' has a removable curved partition E and a similar partition E' extending between the web-plates $l$ and $r$ thereof and somewhat close at their middle portions to the seedbox, the ends of the partitions near the periphery of the wheel being nearly together and the openings between them partially closed by gates F and F', the end 10 of each partition being stationary and the adjacent end of the opposite partition being provided with a gate F or F' in engagement therewith and secured adjustably with respect to the end 10, so that the outlet from the channel formed by the partitions and the exterior of the seedbox may be more or less restricted.

In order to vary the amount of corn that may be deposited in each hill, the pockets in the seed-dropper are each provided with an adjustable hood $z$ or $z'$, that forms the outer wall of the pocket, and thereby the depth of the pocket may be varied, so that a greater or less number of grains may be lifted in a pocket, as may be found desirable.

The seedbox C is provided with a controlling-lever G, coöperating with a latch-bar H, and the box C' is provided with a similar lever G', coöperating with a bar H', the levers having latches 12, adapted to enter holes 14 in the latch-bars, the latter being connected to the main frame by pivots 15.

The wheels B and B' are provided with markers 13 to indicate where the corn may have been dropped into the ground; but these may in some cases be omitted.

At the rear corners of the main frame are vertical posts I and I', extending above and below the frame and fixed thereto, the posts being suitably braced, so as to form marker-supports. Marker-poles J J', carrying markers K K', are pivoted to the lower ends of the posts I I', so that the poles may be elevated. The markers are provided with draft-ropes 16, that are connected to the main frame of the machine. Pulleys 17 and 18 are mounted at the tops of the posts I I', and cables L L' are attached to the marker-poles and run over the pulleys to reels M and M', that are mounted rotatively on a shaft 19, that is mounted on the forward part of the main frame, the cable L being secured to the reel M and the cable L' to the reel M'. Each reel is provided with a lever 20, that extends forwardly when the marker is on the ground and rearwardly when the marker is elevated. Suitable latches 21 are provided for holding the levers in their rearward position. Guide-pulleys, as 22 and 23, are provided at the rear bar $d$ of the frame for guiding the cables L and L'.

Forward of the wheels B B' are housings N N', secured to the main frame and having guides 24 and 25, in which plow-shanks O O' are adjustably supported, a plow P being secured to the lower end of each shank, the upper portion of each shank having holes 26 therein to receive a latch-bolt 27, that is mounted in each guide 24. Each bolt 27 is provided with a spring 28, that normally holds the bolt in a hole 26. Each shank is provided with a handle 29 for lifting the plows during vertical adjustments thereof. The plows P are adapted to open furrows in the ground to receive the corn.

At the rear of the main frame a scraper-frame Q is supported pivotally thereby and carries scrapers R R', arranged so as to engage the tires of the wheels B B' when the soil may be inclined to stick to the tires, the scrapers being brought into operative positions by means of a foot-lever 30, mounted on the bar $c$, and a link 31, connected to the lever and the frame Q, the scrapers ordinarily hanging away from the wheels.

In order to lift the wheels B B' from the ground and to turn the machine about and again set the wheels B B' in proper positions for properly spacing corn for hills, a truck is provided that is ordinarily carried above ground by the machine, although the wheels of the truck may be allowed to roll on the ground, if desired. The truck comprises a pair of arms S and S', journaled to the axle A, the arms extending beyond the axle and being provided with curved rack-bars T T'. A shaft 32 is carried by the lower ends of the arms, and a pair of wheels 33 and 34 are journaled on the shaft. A shaft 35 is mounted rotatively on the main frame, and a pair of pinions U and U' are secured to the shaft in engagement with the rack-bars, so that when the pinions are locked the arms S S' will be held in the positions in which they may be placed. For controlling the pinions, and thereby the arms, a toothed wheel V is secured to the shaft 35, and a ratchet-lever W is journaled on the shaft 35 and provided with a reversible pawl X, pressed by a spring 36 into engagement with the wheel V, the pawl having a handle 37 for reversing the pawl as well as for setting the pawl so as to not contact with the wheel, in the usual manner. A latch Y is provided adapted to engage the wheel V, and the latch is normally held in engagement with the wheel by a suitable spring 38. A foot-lever Z is attached to the latch for disengaging the same from the wheel.

It is designed to provide each machine with a pair of devices similar to the droppers D and D' in all respects except that as many pockets $y$ as possible will be provided, so that corn may be dropped almost continuously thereby and operate to drill the corn or other seed in rows, it being necessary in such case to substitute these devices for those having but two or three pockets and to remove the partitions E and E' and the gates F and F' from the wheels B B', permitting the seeds to be scattered between the web-plates of the wheels. Other obvious modifications may also be made.

In practical use the corn will be scooped up in the pockets $y$ $y'$ from the seedboxes while the droppers D D' rotate with the wheels B B', and when each pocket is at the opening $x$ in the top of the seedbox the corn will drop out of the pocket into the channel at the front of the box and pass between the end 10 and the opposite gate into the ground, the tires $s$ and $t$ covering the corn in their passage over the ground. To prevent dropping of the corn, the levers G and G' are to be manipulated so as to tilt the seedboxes, and thus bring the openings $x$ entirely above the droppers, so that the corn when falling out of the pockets will drop into the boxes and not pass out of the openings. The positions of the hills will be indicated by the markers 13, so that they may be found, if desired, especially in starting to plant in new rows. At the end of each pair of rows planted the lever W is to be operated so as to move the arms S and S' to vertical positions and the wheels 33 and 34 onto the ground, thus elevating the wheels B and B' from the ground. Then the machine may be readily turned about and the wheels B and B' be properly positioned and lowered again onto the ground. Other manipulations will be obviously understood in connection with the description of the construction and functions of the several parts, the machines being in other respects operated somewhat as other planters heretofore in use.

Having thus described the invention, what I claim as new is—

1. A corn-planter including a main frame, an axle journaled to the frame, carrying-wheels secured to the axle, seedboxes journaled on the axle and adjustable relatively to the frame and provided with controlling-levers, latches mounted on the frame and engaged by the levers, rotative seed-droppers mounted in the seedboxes and having pockets for discharging the seed from the seedboxes, and means for conveying the seed from the seed-droppers to the ground.

2. A corn-planter including a main frame, an axle journaled to the frame, a pair of carrying-wheels secured to the axle and having channels therein provided with openings at the wheel-peripheries, a pair of seedboxes mounted rotatively on the axle and provided with controlling-levers, latches for the levers, and seed-droppers mounted in the boxes rotative in unison with the wheels and having pockets for conveying the corn from the boxes to the channels in the wheels.

3. A corn-planter including a main frame, an axle journaled to the frame, carrying-wheels secured to the axle, seedboxes mounted on the axle and adjustable relatively to the main frame and having discharge-apertures in the upper portions thereof, and rotative seed-droppers mounted on the axle in the seedboxes and having pockets for lifting and dropping the seeds through the discharge-apertures.

4. A corn-planter including seedboxes having discharge-apertures in the upper portions thereof, seed-droppers in the seedboxes and having pockets for elevating the seed to the discharge-apertures, an axle extending through the seedboxes and the seed-droppers therein and journaled in the seedboxes, adjustable means connected to the seedboxes and normally holding the same against rotation thereof, means for rotating the seed-droppers, wheels secured to the axle and having seed-channels therein, and a main frame mounted on the axle.

5. A corn-planter including a main frame, an axle journaled to the frame, a pair of carrying-wheels secured to the axle and having channels therein provided with openings at the wheel-peripheries, gates for adjusting the openings of the channels, seedboxes mounted on the axle and provided with controlling devices, and seed-droppers mounted in the boxes rotative in unison with the wheels and having pockets for conveying the seeds from the boxes to the channels in the wheels.

6. A corn-planter including carrying-wheels, an axle secured to the wheels, seedboxes mounted on the axle, seed-droppers mounted on the axle in the seedboxes, a main frame mounted on the axle, a pair of arms journaled between their ends on the axle and provided at their upper ends with rack-bars and at their lower ends with wheels, a rotative shaft journaled on the main frame parallel to the axle, pinions secured to the rotative shaft and engaging the rack-bars, a toothed wheel secured to the rotative shaft between the pinions, a ratchet-lever pivoted on the rotative shaft and having a pawl coöperating with the toothed wheel, and a latch mounted on the main frame in engagement with the toothed wheel and having a foot-lever connected therewith.

7. A corn-planter including a main frame, an axle journaled to the frame, a pair of carrying-wheels secured to the axle and having channels therein provided with openings at the wheel-peripheries, gates for restricting the openings of the channels, seedboxes mounted on the axle and provided with controlling-levers, latches for the levers, seed-droppers mounted in the boxes rotative in unison with the pair of wheels and having pockets for conveying the corn from the boxes to the channels in the wheels, and means for varying the capacities of the pockets.

8. In a corn-planter, the combination of planting-wheels and devices comprising each a hub, a plurality of long spokes attached to the hub, a tire secured to the long spokes, a plurality of relatively short spokes connected rigidly to the long spokes and extending toward the hub but not connected directly thereto, a tire attached to the short spokes, an outer web-plate secured to the long spokes, and an inner web-plate having a central aperture therein and secured to the short spokes, a seedbox arranged in the aperture of the inner web-plate and having a discharge-aperture in the upper portion thereof, a circular seed-dropper in the seedbox, an axle secured to the hub and extending through and supporting the seedbox and the seed-dropper independently, the seed-dropper being rotative with the axle, and a controlling-lever attached to the seedbox.

9. In a corn-planter, the combination of a planting-wheel having a pair of opposing curved partitions therein, an axle secured to the wheel, a seedbox having a discharge-aperture in the upper portion thereof, controlling means attached to the seedbox preventing rotation thereof, and a seed-dropper mounted on the axle rotative therewith and provided with pockets in the periphery thereof, with a main frame mounted on the axle, and a latch mounted on the main frame and engaged by the controlling means.

In testimony whereof I affix my signature in presence of two witnesses.

JOHN H. WILLIAMS.

Witnesses:
Wm. H. Payne,
E. T. Silvius.